March 16, 1965　　B. D. WILLIAMS　　3,173,211
BISECTING DEVICE
Filed Jan. 19, 1962　　2 Sheets-Sheet 1
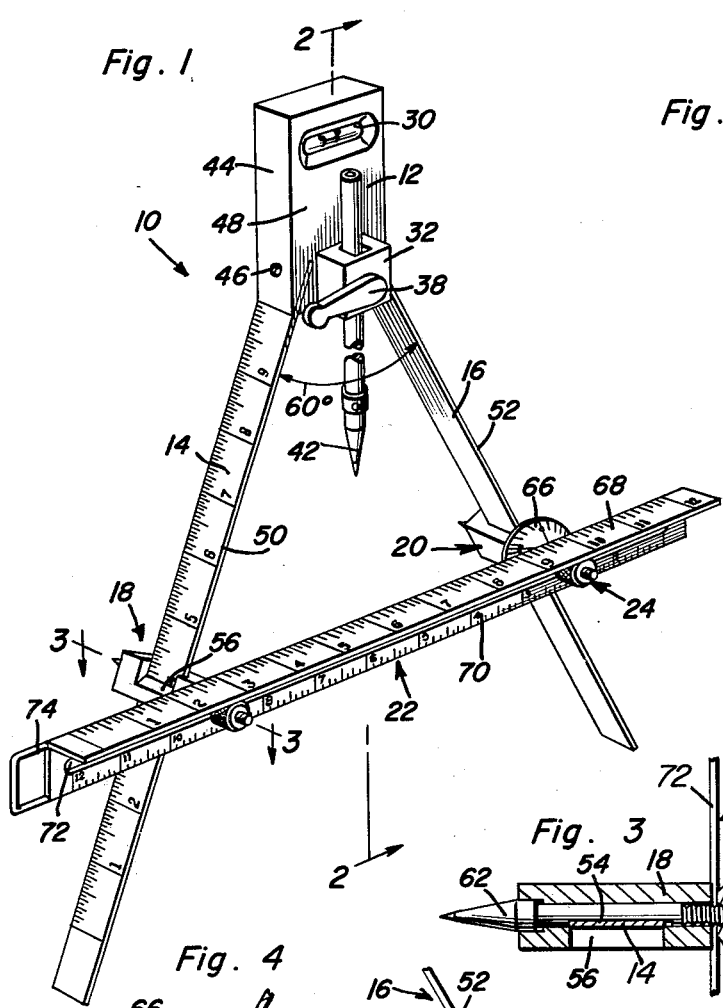
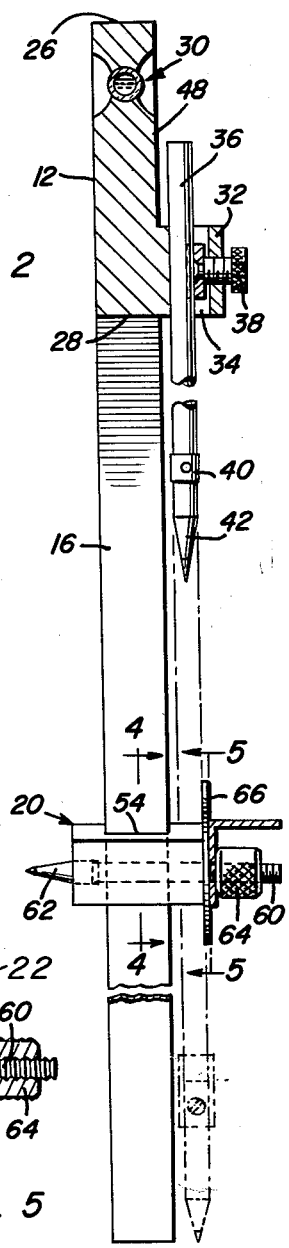
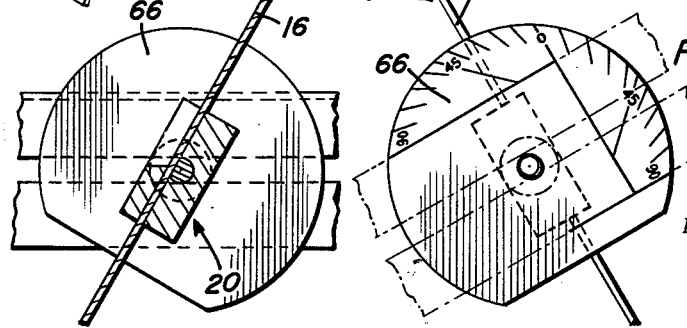
Bill D. Williams
INVENTOR.

March 16, 1965  B. D. WILLIAMS  3,173,211
BISECTING DEVICE
Filed Jan. 19, 1962  2 Sheets-Sheet 2
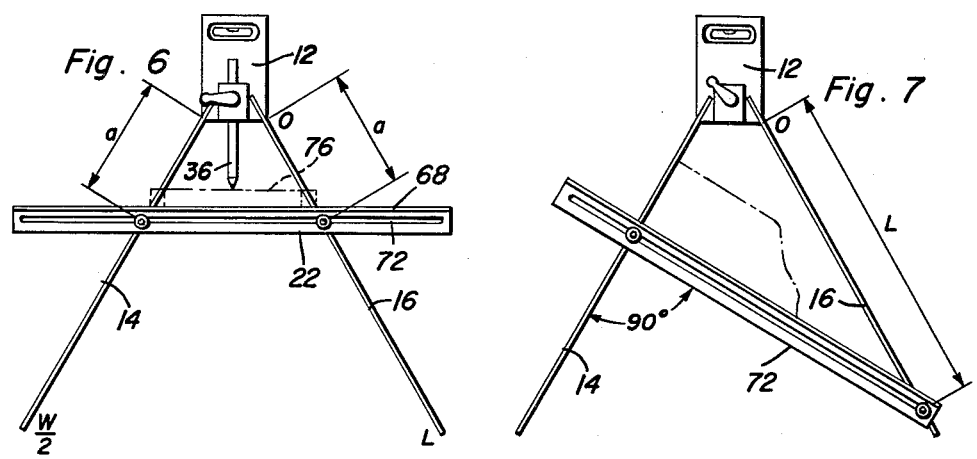
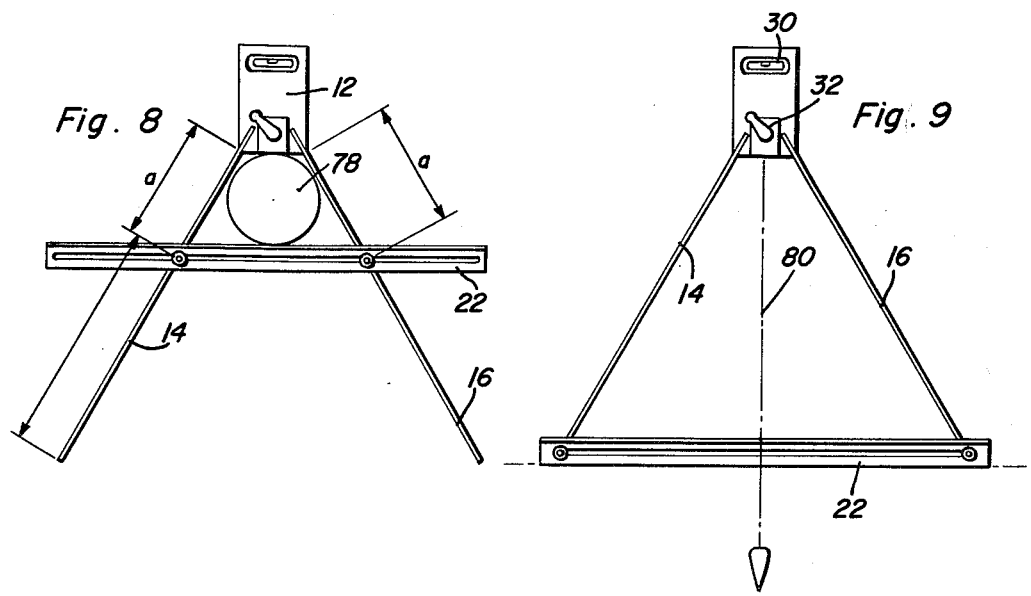
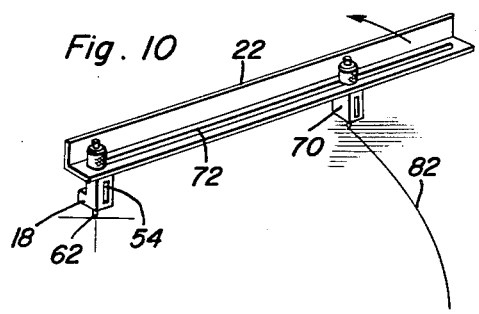
Bill D. Williams
INVENTOR.

United States Patent Office 3,173,211
Patented Mar. 16, 1965

3,173,211
BISECTING DEVICE
Bill D. Williams, Rte. 5, Box 138, Lexington, Miss.
Filed Jan. 19, 1962, Ser. No. 167,240
14 Claims. (Cl. 33—92)

This invention relates to a geometrical instrument serving a plurality of purposes such as bisecting, squaring, levelling, circle scribing, circumferential measuring and vertical plumbing.

The present invention relates to a novel device capable of performing a plurality of functions in a relatively simple and accurate manner. It is therefore an important object of the present invention to provide a useful geometrical instrument for use by carpenters, draftsmen and others or wherever material must be bisected, squared, levelled, etc.

Another object of this invention is to provide a geometrical instrument capable of being utilized for a variety of measuring purposes including for example the measurement of angles, straight lengths as well as circumferential lengths.

A still further object of this invention is to provide a multi-purpose geometrical device having many diverse uses which include for example its use as a compass and also its use as a vertical plumbing device.

An additional object of this invention is to provide a geometrical instrument which in addition to the many uses to which it may be put, is also useful in connection with the measuring and marking of hard to gauge materials.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of an assembled instrument made in accordance with the present invention.

FIGURE 2 is partial sectional view taken substantially through a plane indicated by section line 2—2 in FIGURE 1.

FIGURE 3 is a partial sectional view taken through a plane indicated by section line 3—3 in FIGURE 1.

FIGURE 4 is a partial sectional view taken through a plane indicated by section line 4—4 in FIGURE 2.

FIGURE 5 is a sectional view taken substantially through a plane indicated by section line 5—5 in FIGURE 2.

FIGURES 6 through 10, are simplified diagrammatic views of the instrument illustrating some of its many uses.

Referring now to the drawings in detail, the instrument of the present invention is generally referred to by reference numeral 10 as seen in FIGURE 1. The instrument includes a mounting block 12 to which there are rigidly secured a pair of leg members 14 and 16. The leg members respectively mount slide assemblies generally referred to by reference numerals 18 and 20. A base member 22 is slidably connected to the slide members 18 and 20 and adjustably locked thereto by a pair of angle locking devices 24.

Referring now to FIGURES 1 and 2, it will be observed that the mounting block 12 is of rectangular shape with the width thereof being precisely determined in accordance with the scale units on the legs 14 and 16 as will hereafter be explained. Mounted adjacent the upper end of the block 12 in parallel relation to the top and bottom surfaces 26 and 28, is a horizontal level device 30 of the liquid bubble tube type. Projecting forwardly at the bottom end of the block 12 is a clamp projection 32 which slidably mounts within a clamp bore 34 a stylus holder member 36. Any suitable lock clamping device 38 in therefore provided for engaging the stylus holder 36 in any longitudinal position thereof. The stylus holder therefore mounts adjacent the bottom thereof, a socket member 40 by means of which any suitable marking device 42 may be held. The stylus holder 36 is maintained by the clamp block 32 perpendicular to the surface 28 and equally spaced from the elongated sides 44 of the block 12.

The leg members 14 and 16 are fixedly mounted within the block 12 at an angle of 60 degrees with respect to each other setscrews 46 being provided in the sides 44 of the block 12 for engaging the leg members to hold them securely. It will be observed that the leg members intersect the block 12 at the corners between the bottom surface 28 and the sides 44. Also, it will be observed that the leg members are relatively thin and flat having outside scale surfaces disposed in planes perpendicular to the front face 48 of the block 12 and presenting edges 50 and 52 which define the legs of the 60 degree angle formed between the leg members 16 and 14. The leg members 14 and 16 are of equal length and have disposed on the outside scale surfaces thereof, scale markings which may for example be in inches and fractions thereof. The width of the block 12 will be equal to the width of the leg members, for example 2 inches.

Referring now to FIGURES 2 and 3 in particular, it will be observed that each of the slide assemblies 18 and 20 are blocks which have formed therein, slots 54 for slidably receiving the leg members. One side of the blocks have recesses 56 to expose the scale indicia on the legs for reading thereof along an edge 58 which is alined with the axis through a threaded member 60 and a center pivot member 62. The center pivot member 62 is therefore fixed to the slide block on one side of the leg member opposite the edge portion 50 or 52, while the threaded portion of member 60 extends from the other side of the slide block member. Threadedly engaged with the threaded member 60, is a knurled locknut 64 constituting the angle locking device 24 by means of which the base member 22 is locked to the legs at a desired angle.

One of the slide members 20 is provided with an arcuate protractor plate 66. The plate 66 is scaled off in degrees for indicating the angle between the top leg portion 68 of the base member 22 and the edge portion 52 of the leg member 16. The angle between the base member and the leg member may thereby be readily determined.

The base member 22 in addition to the leg portion 68 is also provided with a leg portion 70 disposed at right angles to the leg portion 68. Both leg portions 68 and 70 have scales thereon while the leg portion 70 is also provided with an elongated slot 72 through which the threaded member 60 extends. The base member 22 is therefore slidably movable with respect to the slide block members 18 and 20 and locked in adjusted position by means of the lock devices 24. A handle member 74 is also connected to one end of the base member 22 for the sake of convenience.

Referring now to FIGURE 6, the procedure utilized in bisecting material 76 will become apparent. The material is alined with the leg portion 68 of the base 22 and with the material thereon, the base is moved toward the mounting block 12 by equal amounts along the leg members until the leg members intersect the line segment defined on the leg portion 68 by the material 76. The marker at the end of the stylus holder 36 may then be lowered for marking the material 76 at a point which bisects the distance measured along the base 22. In order to insure proper bisection, the scales along the legs may be read in order to verify that the distances along the legs are equal. Referring therefore to FIGURE 7, it will be observed that when the base member 22 is adjusted with respect to the leg member 16 at its remote end from the mounting block 12, it will be spaced L units therealong. The base member is adjusted with respect to the leg member 14 so that it intersects the leg member 14 at a 90 degree angle by calculated measurement along scale 14. Material may thereby be squared between the leg member 14 and the base member 22.

Referring now to FIGURE 8, the procedure utilized in measuring the circumferential length C of a cylinder 78 for example, is illustrated. The base member 22 is therefore adjusted along the leg members 14 and 16 and locked in position at equal distances along the leg members from the intersection of the leg members with the block 12, which distances are denoted by *a* in FIGURE 8. The foregoing adjustment is made so as to bring the base member 22 and the bottom surface 28 of the block 12 into tangential relation to the cylinder 78. The diameter of the cylinder 78 will therefore be the vertical spacing between the bottom surface 28 of the block 12 and the top leg portion of the base member 22. Accordingly, by reading the scaled distances *a* on the leg members, the circumferential length of the cylinder 78 may be readily approximated.

FIGURE 9 illustrates the use of the instrument for vertical plumbing purposes. In this case, the instrument is levelled horizontally by use of the levelling device 30 while the base member 22 is locked at the lower ends of the leg members. A plumb line 80 from the clamp 32 when intersecting the base member 22 at a center thereof may be readily determined by the scale markings on the base member 22.

Referring now to FIGURE 10, it will be observed that the base member 22 may be utilized as a compass. The base member 22 is therefore disassembled from the instrument and the slide block 18 locked at one end of the slot 72 in order to form a center point by use of the center pivot element 62. The element 62 on the other slide block 20 may then be adjusted along the slot 72 in order to obtain the proper radius for scribing an arc 82.

From the foregoing description, the use and procedures involved with respect to the geometrical instrument of the present invention will be apparent. A highly useful yet simple device is therefore provided by the present invention capable of being used for scribing circles, bisecting materials, squaring materials, measuring both straight and curved surfaces and for vertical plumbing purposes.

The foregoing is considered as illustrative only of the principles of the invention. Further, since numerous modifications and changes will readily occur to those skilled in the art, it is not desired to limit the invention to the exact construction and operation shown and described, nad accordingly all suitable modifications and equivalents may be resorted to, falling within the scope of the invention as claimed.

What is claimed as new is as follows:

1. A geometrical instrument comprising, mounting means, leg means fixedly secured to said mounting means having scale surfaces in planes intersecting at a predetermined angle to each other, scale indicating slide means slidably mounted on said leg means for respectively measuring distances from opposite ends of the respective leg means, base means slidably connected between said slide means, and angle indicating lock means operatively mounted on the slide means for engagement with the base means to lock the base means at any desired angle to the leg means about axes extending parallel to said scale surfaces.

2. The combination of claim 1, including bisecting means slidably mounted on the mounting means to define a line in bisecting relation to a segment of said base means disposed between said leg means when spaced therealong by the slide means in a predetermined relation.

3. The combination of claim 2, including horizontal levelling means mounted on the mounting means for vertical plumbing in cooperation with said bisecting means.

4. The combination of claim 3, including angle reading means mounted on said slide means cooperating with said base means to indicate the included angle between the base means and leg means.

5. The combination of claim 4, including pivot means on said slide means for scribing circles having radii equal to the spacing on the base means between the slide means.

6. The combination of claim 5, wherein said base means comprises an elongated member having right angle leg portions, one of said leg portions having an elongated slot slidably receiving said slide means.

7. The combination of claim 6, wherein said leg means comprises elongated scale members having edge portions defining with said mounting means a 60 degree angle.

8. The combination of claim 7, wherein said leg means are scaled into units equal to one half the spacing between the intersections of the leg means with the mounting means.

9. The combination of claim 1, including angle reading means mounted on said slide means cooperating with said base means to indicate the included angle between the base means and leg means.

10. The combination of claim 1, including pivot means on said slide means for scribing circles having radii equal to the spacing on the base means between the slide means.

11. The combination of claim 1, wherein said base means comprises an elongated member having right angle leg portions, one of said leg portions having an elongated slot slidably receiving said slide means.

12. The combination of claim 1, wherein said leg means comprises elongated scale members having edge portions defining with said mounting means a 60 degree angle.

13. A geometrical instrument comprising, a level device, a pair of flat leg members fixedly secured to said level device and extending therefrom at a 60° angle to each other, each of said leg members having a scale surface bearing scale indicia, a slide member slidably mounted on each of said leg members having a scale indicating recess exposing the scale indicia on the scale surface in alignment with a pivot axis extending through the slide member parallel to the scale surface, a base member having perpendicular leg portions, a pivot member rotatably mounted in each of said slide members about said pivot axis and extending through a slot formed in one of said leg portions of the base member, and locking means mounted on the pivot member for locking the base member to the slide member at an adjusted angle to the leg member.

14. The combination of claim 13, wherein said slide member is provided with a central bore through which said pivot axis extends for receiving the pivot member and a slot communicating with said scale exposing recess through which the leg member slidably extends.

References Cited by the Examiner

UNITED STATES PATENTS

| | | | |
|---|---|---|---|
| 342,303 | 5/86 | Morrison | 33—216 X |
| 357,771 | 2/87 | Janssen et al. | 33—173 |
| 360,465 | 4/87 | Patterson | 33—92 |
| 868,074 | 10/07 | Clark | 33—84 |
| 986,783 | 3/11 | Tschop | 33—189 |
| 1,237,790 | 8/17 | Kidder | 33—92 |
| 2,505,015 | 4/50 | Thibodeau | 33—27 |
| 2,655,771 | 10/53 | Kline | 33—178 X |

ISAAC LISANN, *Primary Examiner*.

ROBERT L. EVANS, *Examiner*.